June 21, 1955 J. H. BROWN, JR., ET AL 2,711,420
PRODUCTION OF AROMATIC HYDROCARBONS
Filed May 31, 1951
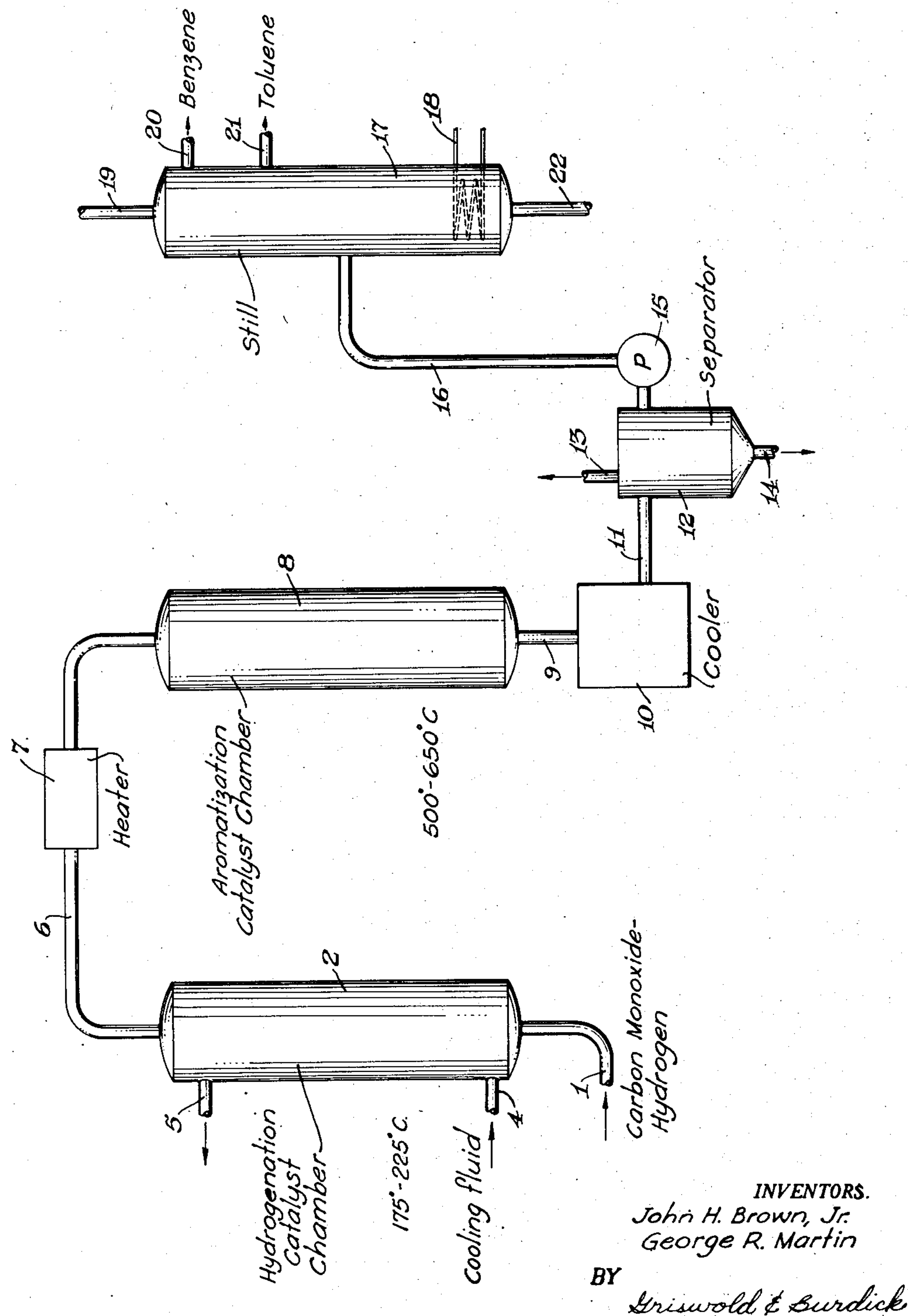

United States Patent Office 2,711,420

Patented June 21, 1955

2,711,420

PRODUCTION OF AROMATIC HYDROCARBONS

John H. Brown, Jr., and George R. Martin, Freeport, Tex., assignors to The Dow Chemical Company, Midland, Mich., a corporation of Delaware Application May 31, 1951, Serial No. 229,100

2 Claims. (Cl. 260—450)

This invention relates to an improved method of making aromatic hydrocarbons by the reaction of carbon monoxide and hydrogen.

The demand for benzene, toluene, and other aromatic hydrocarbons has in recent years far exceeded the supply available from coke-oven operation. As a result, additional large quantities have been made by catalytic reforming of petroleum fractions. However, the difficulty of isolating the aromatic hydrocarbons so prepared and their consequent high cost have raised doubts as to the long-term economic practicality of this source. For that reason, considerable attention has been given to the possibility of making aromatic hydrocarbons by some adaptation of the Fischer-Tropsch and related hydrocarbon syntheses involving the catalytic reaction of the carbon monoxide and hydrogen.

For instance, it has been proposed to carry out the interaction of hydrocarbon and carbon monoxide in the presence of a single catalyst mass made by mixing the usual constituents for promoting hydrocarbon formation with those for inducing aromatization. However, the conditions for hydrocarbon synthesis are so different from those of aromatization that conversion to aromatic products has proved extremely low. In another proposal, selected fractions of the Fischer-Tropsch liquid condensate have been passed at high temperature over conventional aromatizing catalysts. In practice, it is found that the fractions containing those straight-chain hydrocarbons normally regarded as suitable aromatization feeds are such a small part of the total Fischer-Tropsch product that the overall yield of aromatic hydrocarbons from the initial carbon monoxide-hydrogen mixture is very poor, usually under one per cent of that theoretically possible. No real success in the making of aromatic hydrocarbons from carbon monoxide and hydrogen has heretofore been achieved.

It is therefore the principal object of the present invention to overcome many of the difficulties previously encountered and to provide a method of making aromatic hydrocarbons in acceptable yield from carbon monoxide and hyrogen. A related object is to provide a process in which benzene and toluene are formed in a state permitting their ready separation and purification from concomitant materials.

These objects are realized according to the invention by a process in which reaction of carbon monoxide and hydrogen is first effected in the presence of a catalyst consisting essentially of a metal of group VIII of the periodic table at a temperature of 175° to 225° C. The entire product of this reaction is then passed at a temperature of 500° to 650° C. over an aromatization catalyst essentially comprising an oxide of a metal selected from groups V and VI of the periodic table supported on an alumina base. Aromatic hydrocarbons are formed in substantial yield, and may be easily separated from the resulting product.

It will be noted that the new process involves two separate steps, first a formation of hydrocarbons by the catalytic hydrogenation of carbon monoxide under one set of conditions, and second, a catalytic aromatization of the hydrocarbons and accompanying material under an entirely different set of conditions. Further, and it is here that the invention departs most strikingly from prior practice, it is the entire product of the hydrogenation which is subjected to the aromatization. There is no fractionation of the hydrogenation product and aromatization of only selected fractions. Rather, the invention is based on the discovery that results far superior to any heretofore obtained can be realized by taking care that the whole reaction product of carbon monoxide and hydrogen passes over the aromatization catalyst. Both the normally gaseous components of the hydrogenation product, and the hydrocarbons of high molecular weight, rather than being of no value in forming benzene and toluene, as had previously been supposed, actually appear to contribute substantially to the yield of these desirable substances during aromatization.

The invention may be explained in detail with reference to the accompanying drawing, which is a diagram showing the flow of materials in the new process.

A mixture of carbon monoxide and hydrogen from any convenient source at the pressure desired for interaction is passed through a feedline 1 into a reactor 2 filled with a mass of hydrogenation catalyst, hereinafter characterized. Since the reaction of carbon monoxide and hydrogen is highly exothermic, the reactor 2 is provided with an internal cooling system (not shown) supplied by cooling fluid flowing from an inlet 4 to an outlet 5. The rate of heat removal is controlled to hold any predetermined reaction temperature in the range of 175° to 225° C. The design of the reactor may be any of those well known in the art.

The effluent from the catalyst bed consists, in addition to unreacted carbon monoxide and hydrogen, mainly of straight-chain aliphatic hydrocarbons, water, and carbon dioxide. Some oxygenated compounds, largely alcohols and aldehydes, may or may not be present to an appreciable extent, depending on the particular catalyst used. This entire effluent, without condensation or segregation of any portion, is passed through a line 6 and heater 7 to a second reactor 8 filled with aromatization catalyst, later described. Since the aromatization is endothermic, the heater 7 is regulated to maintain in the reactor 8 a suitable temperature in the range 500° to 650° C., or heat may be supplied directly in the reactor. The reactor 8 is usually operated at the same or lower presure than the reactor 2, although if a higher pressure is desired, a pump, not shown, may be interposed in the line 6.

The effluent from the reactor 8 is passed through a line 9 to a cooler 10 operated to condense the normally liquid components in the stream, mostly hydrocarbons and water. The entire stream is then transferred through a line 11 to a phase separator 12. Normally gaseous products are withdrawn through an upper outlet 13, and may be recycled to the feed inlet 1 if desired. Water separates as a layer and is removed through a bottom outlet 14. Liquid hydrocarbons are forwarded by a pump 15 through a line 16 into the midpoint of a continuous fractionating column 17. In the column, the hydrocarbons, heated by a steam coil 18, are separated into a light overhead at 19, which may be returned to the feed inlet 1, a benzene product fraction at 20, toluene at 21, and heavier bottoms at 22. When individual aromatic hydrocarbons of extreme purity are required, the fractions at 20 and 21 may be refractionated, or further purified by solvent extraction or extractive distillation, as needed.

The interaction of carbon monoxide and hydrogen in chamber 2 is conveniently carried out with the temperature, pressure, and flow rates customary in the Fischer-Tropsch process. Thus the ratio of hydrogen to carbon monoxide may vary from about 1.4:1 to about 2.2:1. Reaction temperatures in the catalyst bed should be held within the approximate range of 175° to 225° C. Pressure may be from 1 to 50 atmospheres, preferably below 20 atmospheres, and is best held constant throughout. The flow rate is preferably in the range 50 to 1000 volumes (0° C.; 1.0 atmosphere) of feed gas per bulk volume of catalyst per hour.

The catalyst used in the reactor 2 may be any of the types well-known for the synthesis of hydrocarbons from carbon monoxide and hydrogen. The metals of Group VIII of the periodic table are satisfactory, at least one of the metals cobalt, iron, and nickel being preferred. These catalysts may be supported on carriers, such as kieselguhr, alumina, or silica, and may be promoted with lesser proportions of other metals or metal oxides, such as copper, thoria, magnesia, and potassia. The catalysts are prepared in conventional manner, as by impregnating particles of the carrier with a reducible salt or oxide of cobalt, iron, or nickel and thereafter reducing the salt or oxide to form the catalytic metal in situ. As is known, the reduction may be effected by contact of the catalyst mass with hydrogen at elevated temperature, either in the early stages of the reaction of carbon monoxide and hydrogen, or by separate treatment with hydrogen prior to use.

The aromatization in reactor 8 is carried out at 500° to 650° C., using catalysts of the type heretofore employed for the cyclization of straight-chain paraffin hydrocarbons. Effective catalysts consist essentially of at least one oxide of a metal groups V and VI of the periodic table, supported on a greater proportion of a difficultly reducible oxide carrier, viz. an oxide of chromium, molybdenum, tungsten, uranium, vanadium, columbium, and tantalum, supported on alumina, magnesia, or silica. An alumina-chromia catalyst is preferred. The catalyst used is advantageously activated before use by passing hydrogen over it at operating temperature. The pressure in the reactor 8 is conveniently about one atmosphere, though higher pressures, up to 50 atmospheres or more, may be used. The flow rate is preferably such as to correspond to a contact time of from several seconds up to perhaps a minute.

The following examples will further illustrate the invention.

*Example 1*

In a small-scale laboratory demonstration, the synthesis gas used in making benzene consisted of 30 per cent by volume of carbon monoxide, 67 per cent hydrogen, and 3 per cent inert gas. The synthesis catalyst consisted of 49.4 per cent by weight of cobalt, 1.9 per cent magnesia, 9.4 per cent thoria, and 39.3 per cent kieselguhr in the form of ⅛-inch pellets. The aromatization catalyst consisted of 3 parts by weight of molybdenum oxide and 3 parts of chromium oxide supported on 94 parts of alumina.

A stream of the synthesis gas was passed through a reaction tube containing a mass of the synthesis catalyst having a bulk volume of 1.0 liter. With the catalyst mass maintained at 190° to 198° C., 14.15 cubic feet of the synthesis gas (measured at 0° C. and 1.0 atmosphere pressure) was fed at a constant rate over a 6-hour period. The entire stream leaving the synthesis zone was passed at once through a tube containing a 0.25 liter bed of the aromatization catalyst maintained at 600° C. The resulting aromatized effluent was passed through a water-cooled condenser to recover liquid products. There was obtained 15.5 grams of an oily liquid from which, by fractional distillation, there was separated 7.4 per cent by weight of benzene.

*Example 2*

In another test, the synthesis gas and catalyst were the same as in Example 1. The aromatization catalyst consisted initially of pellets of 6 parts by weight chromium sesquioxide, 5.5 parts of molybdenum trioxide, and 4.5 parts of vanadium pentoxide supported on 84 parts of alumina. The catalyst was activated by passing hydrogen over it at the reaction temperature.

A total of 18.85 cu. ft. (0° C. 1.0 atmosphere) of the synthesis gas was passed through 1.0 liter of the synthesis catalyst at 202° to 208° C. during 5.9 hours. The entire effluent was then passed through 0.25 liter of the activated aromatization catalyst at 593° C. From the aromatized product there was condensed 21.3 grams of liquid product containing 28.2 per cent by weight of benzene.

*Example 3*

In this test, the synthesis gas and catalyst were as in Example 1. The aromatization catalyst consisted initially of particles of 5.8 parts of chromium sesquioxide, 4.4 parts of vanadium pentoxide, and 5.3 parts of molybdenum trioxide impregnated in 84.5 parts of alumina. It was activated before use by passing hydrogen over it at an aromatization temperature.

A total of 11.95 cu. ft. (0° C., 1.0 atmosphere) of the synthesis gas was passed through 1.0 liter of the synthesis catalyst at 200° C. during 5 hours. The entire product was then passed through 0.25 liter of the aromatization catalyst at 600° C. From the aromatized product there was condensed 6.4 grams of a liquid product containing 38.3 per cent benzene and 31.1 per cent toluene.

What is claimed is:

1. A process for making aromatic hydrocarbons which comprises effecting reaction of carbon monoxide and hydrogen in the presence of a catalyst consisting essentially of at least one metal of group VIII of the periodic table at a temperature of 175° to 225° C., thereafter passing the entire product of the reaction over an aromatization catalyst essentially comprising at least one oxide of a metal selected from groups V and VI of the periodic table supported on a difficultly reducible oxide carrier at a temperature of 500° C. to 650° C., and separating aromatic hydrocarbons from the resulting product.

2. A process for making benzene which comprises passing a mixture of hydrogen and carbon monoxide in a molecular ratio from 1.4:1 to 2.2:1 through a bed of a catalyst essentially comprising at least one metal selected from the group consisting of cobalt, iron, and nickel at a temperature between 175° and 225° C., a pressure less than 50 atmospheres and a space velocity between 50 and 1000 volumes per volume of catalyst per hour, thereafter passing the entire product of the reaction through a bed of an aromatization catalyst essentially comprising chromium oxide supported on alumina at a temperature between 500° and 650° C., a pressure less than 50 atmospheres, and a flow rate corresponding to a contact time less than one minute, cooling the product to condense normally liquid material therefrom, and separating benzene from the condensate.

References Cited in the file of this patent

UNITED STATES PATENTS

| | | |
|---|---|---|
| 2,154,676 | Haeuber et al. | Apr. 18, 1939 |
| 2,347,682 | Gunness | May 2, 1944 |
| 2,471,914 | Sweetser | May 31, 1949 |

FOREIGN PATENTS

| | | |
|---|---|---|
| 297,179 | Great Britain | Sept. 20, 1928 |
| 574,973 | Great Britain | Jan. 29, 1949 |